United States Patent
Diaz-Cuellar et al.

(10) Patent No.: US 10,659,466 B2
(45) Date of Patent: May 19, 2020

(54) SECURE RESOURCE-BASED POLICY

(71) Applicant: Microsoft Technology Licensing, LLC, Redmond, WA (US)

(72) Inventors: Gerardo Diaz-Cuellar, Kirkland, WA (US); Benjamin M. Schultz, Bellevue, WA (US); Ivan Dimitrov Pashov, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 15/235,509

(22) Filed: Aug. 12, 2016

(65) Prior Publication Data
US 2017/0279805 A1    Sep. 28, 2017

Related U.S. Application Data

(60) Provisional application No. 62/311,775, filed on Mar. 22, 2016.

(51) Int. Cl.
    *H04L 29/06*    (2006.01)
(52) U.S. Cl.
    CPC .......... *H04L 63/10* (2013.01); *H04L 63/0807* (2013.01); *H04L 63/20* (2013.01)
(58) Field of Classification Search
    CPC ...... H04L 63/10; H04L 63/0807; H04L 63/20
    See application file for complete search history.

(56) References Cited

U.S. PATENT DOCUMENTS

| 6,253,325 | B1 |   | 6/2001 | Steele et al. |
| 7,069,330 | B1 |   | 6/2006 | McArdle et al. |
| 7,370,351 | B1 | * | 5/2008 | Ramachandran ....... H04L 63/08 726/4 |
| 7,685,298 | B2 | * | 3/2010 | Day ................. H04L 29/12594 709/227 |

(Continued)

FOREIGN PATENT DOCUMENTS

| WO | 2013123490 A1 | 8/2013 |
| WO | WO2015080731 A1 | 6/2015 |

OTHER PUBLICATIONS

Jang, Minsung, "Virtual Platforms: System Support to Enrich the Functionality of End Client Devices", In Master's Thesis of Georgia Institute of Technology, Aug. 2015, 134 pages.
(Continued)

*Primary Examiner* — Techane Gergiso
(74) *Attorney, Agent, or Firm* — Newport IP, LLC; Jacob P. Rohwer

(57) ABSTRACT

The techniques and systems described herein improve security and improve connection reliability by providing a framework for an application to communicate its intent to an authority service so that the authority service can enforce networking security requirements. In various examples, an intent to access a resource over a network is received and queries are sent to resolve a network connection that enables access to the resource. Information for the resource is then collected and stored together in a trusted and secure environment. For instance, the information can include proxy data or can include hostname data. A ticket can be created based on the information. The ticket can be used to establish and maintain a secure network connection to the resource.

20 Claims, 7 Drawing Sheets

(56) References Cited

U.S. PATENT DOCUMENTS

| | | | |
|---|---|---|---|
| 7,685,632 B2 | 3/2010 | Vayman | |
| 8,477,778 B2 | 7/2013 | Lehmann, Jr. et al. | |
| 8,943,208 B2 | 1/2015 | Bafna et al. | |
| 9,038,168 B2 | 5/2015 | Ben-Zvi et al. | |
| 9,131,010 B2 | 9/2015 | Agrawal et al. | |
| 9,143,492 B2 | 9/2015 | Redberg et al. | |
| 9,548,982 B1* | 1/2017 | Karunakaran | H04L 63/10 |
| 2003/0084168 A1* | 5/2003 | Erickson | H04L 63/102 |
| | | | 709/229 |
| 2003/0177387 A1* | 9/2003 | Osterwalder | H04L 63/0209 |
| | | | 726/12 |
| 2008/0077809 A1* | 3/2008 | Hayler | G06F 12/1466 |
| | | | 713/193 |
| 2011/0167479 A1 | 7/2011 | Maes | |
| 2011/0282997 A1* | 11/2011 | Prince | H04L 63/1458 |
| | | | 709/226 |
| 2011/0296515 A1* | 12/2011 | Krstic | G06F 21/53 |
| | | | 726/10 |
| 2012/0079055 A1* | 3/2012 | Robinson | H04L 61/1511 |
| | | | 709/213 |
| 2013/0205366 A1* | 8/2013 | Luna | H04L 63/101 |
| | | | 726/1 |
| 2014/0250511 A1* | 9/2014 | Kendall | H04L 63/0815 |
| | | | 726/6 |
| 2015/0180894 A1* | 6/2015 | Sadovsky | G06F 3/0481 |
| | | | 726/22 |
| 2015/0286834 A1* | 10/2015 | Ohtani | G06F 21/6218 |
| | | | 726/28 |
| 2016/0006693 A1 | 1/2016 | Salcedo | |
| 2016/0197909 A1* | 7/2016 | Innes | H04L 63/0807 |
| | | | 726/6 |

OTHER PUBLICATIONS

Wang, et al., "Unauthorized Origin Crossing on Mobile Platforms: Threats and Mitigation", In Proceedings of the ACM SIGSAC Conference on Computer & Communications Security, Nov. 4, 2013, 12 pages.

"International Search Report and Written Opinion Issued in PCT Application No. PCT/US2017/022616", dated Jul. 7, 2017, 11 Pages.

"Office Action Issued in European Patent Application No. 17714346.8", dated Nov. 22, 2019, 5 Pages.

* cited by examiner

SECURE RESOURCE-BASED POLICY

PRIORITY APPLICATION

This application claims the benefit of and priority to U.S. Provisional Application No. 62/311,775, filed Mar. 22, 2016, the entire contents of which are incorporated herein by reference.

BACKGROUND

The way in which a network connection is typically established and maintained has gaps that allow malicious entities (e.g., malicious code) to perform various attacks on unsuspecting devices and/or unsuspecting users. For instance, a single Internet Protocol (IP) address of a resource to be accessed could be hosting multiple web servers or could be a network endpoint with many types of servers and services running behind the network endpoint on a private network. Moreover, IP addresses can be loosely associated with a hostname or a domain name and/or the IP addresses associated with a resource can dynamically change (e.g., multiple times per minute in some instances).

To further complicate this issue, network components (e.g., a network stack) use IP addresses and can be agnostic to hostnames, and thus, a name-based policy applied in the network stack often cannot effectively determine whether access to an IP address should be denied or allowed (e.g., due to load balancing across different IP addresses, due to Content Delivery Networks representing many different resources via a set of IP addresses, etc.). For instance, an application can have freedom to cache its own set of destination IP addresses and then connect directly to those IP addresses without using a hostname. This can make security and/or policy enforcement difficult because the operating system is "blind" to which resources the application connects to and this hampers the ability for the operating system or other components to enforce a reliable security policy because malicious applications can circumvent a name-based policy by using IP addresses. Consequently, a host operating system has no end-to-end understanding of the information being used to establish and/or maintain a network connection to a resource. Stated another way, components of a device used to establish and maintain network connectivity do not coordinate with each other to retain the information and to provide a holistic and/or unified view into how the network connection is, or is to be, established and maintained.

Rather, the application is typically responsible for driving the coordination of these components, therefore making it impossible for the operating system to know or understand the coordination information. Thus, the operating system is unaware of the coordination. In some instances, the application can even act as a filter that prevents the operating system from obtaining and understanding this coordination information so that it can be passed down to lower levels of the operating system where enforcement can happen. This makes it difficult, or even impossible, to build an effective policy. Moreover, this makes it difficult, or even impossible, to reliably enforce a policy (e.g., a routing policy, a firewall policy, a sandboxing policy, etc.).

Furthermore, most current network connectivity is established and maintained in accordance with a single network interface. This design makes assumptions that correlate a hostname of a resource to a fixed set of IP addresses to establish connections so that information can be exchanged. This design is implemented both by network stack software and application software. It impacts network roaming, resource caching (e.g., names, IP addresses), and security enforcement. However, many mobile devices currently being used are equipped with multiple network interfaces, and therefore, these mobile devices provide new dynamics such that an application executing on a mobile device may want to establish and maintain network connection(s) with a resource while the mobile device switches between networks (e.g., from a wired network to a wireless network and vice versa, from a Wi-Fi connection to a mobile broadband connection and vice versa, etc.). Moreover, in some cases, reliability issues can arise when a network claims to have access to a resource, but it actually does not.

SUMMARY

The techniques and systems described herein improve security and improve connection reliability by providing a framework for an application to communicate its intent to an authority service so that the authority service can understand and enforce security requirements for the application. In one example, the authority service can be implemented using components of an operating system of a device that executes the application. In another example, the authority service can be implemented using components of network device(s) in communication with the device that executes the application. In yet another example, the authority service can be implemented using both (i) components of an operating system of a device that executes the application and (ii) components of network device(s) in communication with the device that executes the application.

In various examples, an intent to access a resource over a network is received. The intent can be received from an application executing on a device, from a virtual machine, from a container, etc. The intent is then compared to policies (e.g., stored policies, accessed policies, downloaded policies, etc.) to confirm that access to the resource is permitted and networking components are configured to send queries to resolve a connection and to enable network access to the resource. Information for the resource can then be collected and stored in a trusted and secure environment. For instance, the information can include data such as proxy data (e.g., for detection and/or determination) and hostname data (e.g., Domain Name System (DNS) records, Directory Service records, NetBIOS Name Service (NBNS) member list, Link Local Multicast Name Resolution (LLMNR), etc.). A ticket can then be created that includes the information for the resource. A reference identifier for the ticket, or a handle to the ticket, can then be provided (e.g., to the application, to the virtual machine, to the container, etc.) and subsequently used to establish and maintain a secure and reliable connection to the resource. That is, the secure and reliable connection to the resource can be established and/or maintained based on the intention described in the ticket. In various examples, changes to the information (e.g., dynamically changing IP addresses, a switch in network interfaces, etc.) are monitored and the ticket can be updated based on the monitored changes. Thus, the application and operating system can effectively track, update, and maintain a valid network connection to an approved resource in a seamless manner.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, engine(s), module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical components.

DETAILED DESCRIPTION

Figure 1:
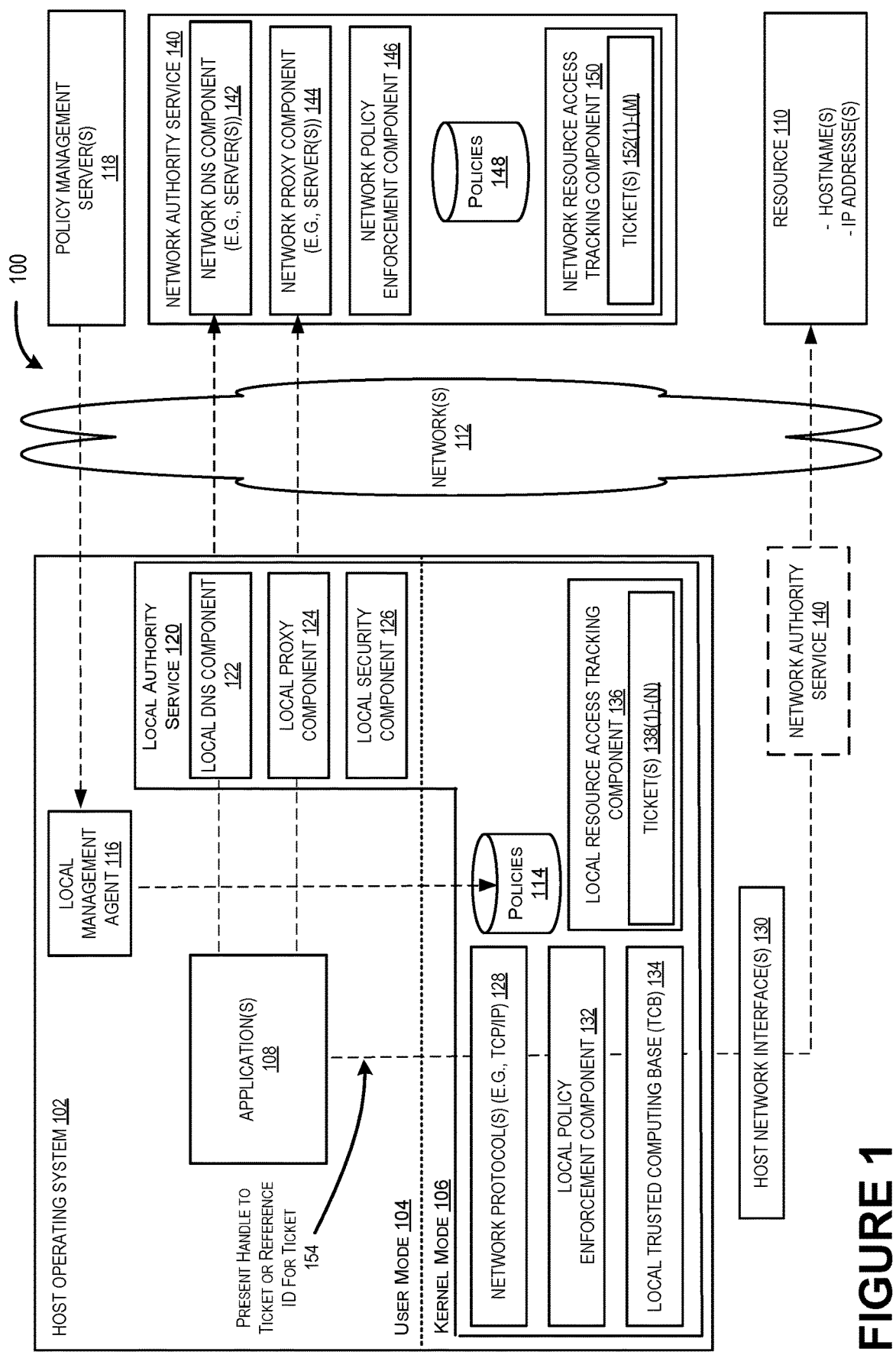
FIG. 1 illustrates an example environment in which the establishment and maintenance of a network connection, in accordance with policies, can be implemented.

The techniques and systems described herein provide a secure and reliable way of establishing and maintaining a network connection that provides access to a resource. The establishment and maintenance of a network connection to a resource obeys policies (such as network policies, security policies, enterprise data policies, application sandboxing policies, etc.). A resource can comprise a network end-point such as a web server hosting a web site to be accessed, a file server storing a file to be accessed, a cloud database to be accessed, a home appliance being accessed for remote control of its functions, a streaming media service to be accessed to watch a video, etc. In various examples, a resource can be associated with one or more Internet Protocol (IP) addresses, one or more hostnames (e.g., "www.examplewebpage.com"), and/or one or more full networks.

As described above, the way in which a network connection currently is established and maintained has gaps that allow malicious entities (e.g., malicious code) to perform various attacks on unsuspecting devices and/or unsuspecting users. For instance, components of a device used to establish and maintain network connectivity do not coordinate with each other to retain the information and to provide a holistic and/or unified view into how the network connection is, or is to be, established and maintained. Moreover, the application is typically responsible for driving the coordination of these components, therefore making it impossible for the operating system or other components to know or understand the coordination. Thus, the operating system is unaware of the coordination, making it difficult, or even impossible, to build and reliably enforce a policy.

The techniques and systems described herein improve security and improve connection reliability by providing a framework for an application to communicate its intent to an authority service so that the authority service can enforce security requirements on the application. In one example, the authority service can be implemented using components of an operating system of a device that executes the application. In another example, the authority service can be implemented using components of network device(s) in communication with the device that executes the application. In yet another example, the authority service can be implemented using both (i) components of an operating system of a device that executes the application and (ii) components of network device(s) in communication with the device that executes the application.

In various implementations, an intent to access a resource over a network is received (e.g., from an application executing on a device, from a virtual machine, from a container, etc.). The intent is then compared to policies to confirm that access to the resource is permitted. Information for the resource is collected and stored in a trusted and secure environment. For instance, the information can include data such as proxy data (e.g., for detection and/or determination, proxy script URL, a web proxy auto detection (WPAD), proxy name, proxy address, proxy port, resource URL, interfaces used by DNS or a proxy resolution instance), interface binding or scoping data specified by a connectivity policy, an interface that was acquired/connected, hostname data (e.g., Domain Name System (DNS) records, multicast DNS (mDNS), APPLE BONJOUR®, Directory Service records, NetBIOS Name Service (NBNS) member list, Link Local Multicast Name Resolution (LLMNR), etc.), and/or a proof of trust (e.g., a proof of trust from a higher authority). A ticket that has the information can then be created. A handle to the ticket, or a reference identifier for the ticket, can then be provided (e.g., to the application, to the virtual machine, to the container, etc.) and subsequently used to establish and maintain a secure and reliable connection to the resource. That is, the secure and reliable connection to the resource can be verified based on the intention described in the ticket, thereby ensuring that a network connection does not violate a policy (e.g., a network access is enforced on the application). In various examples, changes to the information (e.g., dynamically changing IP addresses, a switch in network interfaces, etc.) are monitored and the ticket can be updated based on the monitored changes. Thus, the application and operating system can effectively track, update, and maintain information associated with a network connection to an approved resource in a seamless manner to ensure that the network connection is in compliance with one or more policies.

Consequently, using the tickets in a trusted and secure environment, as described herein, an authority service is able to understand an intent to access a resource over a network, and based on the intent, is able to (i) initially confirm that access to the resource is allowed and (ii) collect and store information useable to establish and maintain a network connection together, in a trusted and secure environment. Moreover, a hostname can be resolved and securely mapped to an IP address. The ticket can be used (e.g., checked) throughout differing connection layers (e.g., within a client device and/or on network devices) to determine that a policy does not prohibit network access to a resource (e.g., based on a specific application, based on a specific client device, based on a specific location, based on a specific network, based on information in the ticket, etc.). Therefore, an application, when requesting access to the resource, can be required to present a handle to the ticket or a reference identifier for the ticket before operating system components enable access to the resource. This can prevent malicious attacks by an application and/or insecure access attempts (e.g., an inappropriate access attempt by a poorly written application that is exposed to an attack).

FIG. 1 illustrates an example environment 100 in which the establishment and maintenance of a network connection, in accordance with policies, can be implemented. FIG. 1 illustrates a host operating system 102 that is configured to operate in a user mode 104 (also known as a "user space") and a kernel mode 106. The host operating system 102 runs an application or multiple application(s) 108 (referred to herein as an application 108), or application software, in the user mode 104. The host operating system 102 runs core operating system components in the kernel mode 106. The host operating system 102 can be a physical operating system, a virtual operating system (e.g., a virtual machine), or a container.

As described above, an application 108 can be configured to request access to a resource 110 via one or more networks 112, the resource 110 being associated with hostname(s) and IP address(es). The host operating system 102 can determine whether access is permitted based on one or more policies 114. Therefore, in various implementations, the host operating system 102 includes a local management agent 116 that manages policies 114 and configuration for the host operating system 102. For example, the local management agent 116 can receive a policy or a policy update from policy management server(s) 118 that generate the policy and/or the policy update, and pass the policy or the policy update to a policy store that maintains the policies 114 for how resources are to be accessed. For instance, a given resource may only be accessible from specific locations or via specific networks.

The host operating system 102 includes a local authority service 120. In various implementations, the local authority service 120 is a trusted entity that is configured to collect information from multiple different components (e.g., networking components) and store the information together in a single place so that it can be used to establish a secure and reliable connection, and more specifically, to determine that the information used to establish and/or maintain a connection conforms to one or more policies 114.

In various examples, a networking component associated with the local authority service 120 includes a local DNS component 122 that is configured to resolve one or more IP addresses of a resource based on a hostname requested by an application 108. The local DNS component 122 is also configured to maintain a cache of DNS records that map hostnames to IP addresses, the DNS records provided by DNS servers. In other embodiments, the local DNS component 122 can be replaced by, or supplemented with, another name service or directory service component.

In various examples, a networking component associated with the local authority service 120 includes a local proxy component 124. The local proxy component 124 is configured to identify proxy information when network access is requested by an application 108 and to ensure connectivity to a resource through one or more proxies. For instance, proxy information can include Hypertext Transfer Protocol (HTTP)-based proxy servers and/or Dynamic Host Configuration Protocol (DHCP) client identification. In some examples, the proxy information can include Web Proxy Auto-Discovery (WPAD) information, which uses DNS and DHCP to detect a location of a proxy script which can be executed to produce one or more proxies for a given host. The proxies are returned by the local proxy component 124 to the application 108. Alternatively, proxy scripts and proxies can be configured by an administrator. Accordingly, the local authority service 120 can dictate which proxies to use and in which way (e.g., either statically or through WPAD dynamic mechanisms). In one example, the local proxy component 124 can be part of a devices HTTP stack implementation.

In various examples, a component associated with the local authority service 120 includes a local security component 126. The local security component 126 (e.g., a subsystem component) is responsible for local system security policy (e.g., users and groups, password policies, privileges, audit settings, etc.), user authentication, sending security audit messages to an event log, and so forth.

In various examples, a networking component associated with the local authority service 120 includes one or more network protocol components 128, which are configured to manage network connectivity using host network interfaces 130. For instance, TCP/IP provides transport-layer (TCP/UDP) and network layer (Internet Protocol) connectivity to a resource. Other embodiments may use alternative transport protocols such as Stream Control Transmission Protocol (SCTP), Delay-Tolerant Networking (DTN), etc.

In various examples, a networking component associated with the local authority service 120 includes a local policy enforcement component 132. The local policy enforcement component 132 is configured to monitor network traffic, and permit (e.g., forward) or prevent (e.g., drop) the network traffic based on policies 114. In various implementations, a policy 114 can contain packet fields that specify an IP address and/or a TCP port. In other implementations, a policy 114 can be a name or a ticket-based policy. The local policy enforcement component 132 can be implemented as a firewall, or software that works with or as an alternative to a firewall, such as routing software.

In various examples, a networking component associated with the local authority service 120 includes a local trusted computer base (TCB) component 134. The local TCB component 134 includes hardware and/or software that provides a security foundation for the host operating system 102. In some embodiments, TCB includes or integrates with the local security component 126, network protocols 128, the local policy enforcement component 132, and/or a local resource access tracking component 136.

In various examples, a networking component associated with the local authority service 120 includes the local resource access tracking component 136. The local resource access tracking component 136 interacts and works with the other components of the local authority service 120 to collect information useable to establish a network connection and to create, for individual network connections, tickets 138(1) . . . 138(N) (where N is a positive integer number such as 1, 2, 3, 5, 10, 25, 50, 100, and so forth). For example, the information collected and included in a ticket can include data such as proxy data (e.g., for detection and/or determination) determined by the local proxy component 124, hostname data (e.g., Domain Name System (DNS) records, Directory Service records, NetBIOS Name Service (NBNS) member list, etc.), a host network interface 130 configured to use the hostname data (e.g., an IP address, hostname, time to live (TTL), etc.), the proxy information to establish the connection, and/or an application ID (e.g., a process ID, an application package ID, etc.). In many cases, the information useable to establish a network connection may depend on the network interface to be used (e.g., 3G interface, Wi-Fi interface, an Ethernet interface). Consequently, the local resource access tracking component 136 is configured to track and maintain, in a single place, information required to establish a network connection to a resource 110 on behalf of an application 108. In some embodiments, this connection is also maintained on behalf of application 108. In previous connectivity architectures, separate pieces of this information were handled by different components, were not shared amongst the different components, and were often disposed of. Thus, with previous connectivity architectures, enforcement of policy was not effective.

The tickets 138(1) . . . 138(N) (referred to herein as a ticket 138) can include information that is indicative of context and/or an intent of an application to access a resource to exchange information (e.g., push information to the resource, request information from the resource, etc.). A ticket 138 is a trusted mechanism that can be used to enforce a policy because the information included in the ticket 138 is provided by secure components of an authority service (e.g., the local authority service 120, a network authority service 140 as further described herein, or a combination of both). Moreover, creation and handling of the ticket 138 is implemented by a secure component (e.g., the local resource access tracking component 136). Stated another way, although an application 108 uses a ticket 138 to request and establish a network connection, the ticket 138 cannot be altered or modified by the application 108. Rather, the local resource access tracking component 136 is configured to provide a handle to the ticket 138 to the application and keep its own copy of the ticket 138 so that, when the handle is presented by the application 108, a comparison can be made to confirm the ticket is valid. In an alternative implementation, the local resource access tracking component 136 is configured to provide a reference identifier for the ticket (e.g., ticket number 12345) to the application 108 so that, upon presentation by the application 108, a securely stored ticket 138 can be identified. Accordingly, via the use of a ticket, an application does not have the ability to falsify an access (e.g., initially provide intent to access an allowed website and then request access to a prohibited website). That is, the application cannot receive a ticket to access the allowed website and then present information associated with the ticket to access the prohibited website (e.g., the local policy and enforcement component 132 will detect the inconsistency and block access to the prohibited website since the ticket is not associated with the prohibited website). In various examples, the ticket, the handle to the ticket, and/or the reference identifier for the ticket can each include a time stamp, a version number, and/or a sequence number so that the authority service can keep track of information used to establish and/or maintain a network connection over a period of time.

Some embodiments are integrated with software deployment. For example, the resources required for an application can be declared by the developer. As part of software deployment of one or more new applications 108, the resource(s) can be pre-determined and policies 118 can be updated accordingly. In another example, the local management agent 116 recognizes when one or more new applications 108 are deployed and notifies the policy management servers 118, resulting in updated policies 118. Other embodiments may not be integrated with software deployment. These embodiments may co-exist in some scenarios such as an enterprise mobility scenario in which some applications are deployed from a public source (e.g. a public software "app store" run by MICROSOFT for WINDOWS® or by APPLE for iOS) and some applications are deployed by the enterprise. Some embodiments may choose to group applications 108 to apply policy which may result in a smaller policy footprint. In some embodiments, if policy is updated, it may require a ticket to be renewed.

FIG. 1 also illustrates a network authority service 140, components of which can be used with (e.g., in combination) or in place (e.g., as an alternative) of the components of the local authority service 120. For instance, the network authority service 140 can include a network DNS component 142 (e.g., DNS servers) that interacts with the local DNS component 122 and/or performs functionality similar to the local DNS component 122, a network proxy component 144 (e.g., proxy servers) that interacts with the local proxy component 124 and/or performs functionality similar to the local proxy component 124, a network policy enforcement component 146 that interacts with the local policy enforcement component 132 and/or performs functionality similar to that performed by the local policy enforcement component 132, polices 148 stored on the network, and a network resource access tracking component 150 that interacts with the local resource access tracking component 136 and/or performs functionality similar to that performed by the local resource access tracking component 136 (e.g., the network resource access tracking components including tickets 152(1) . . . 152(M), where is a positive integer number). Since the components of the network authority service 140 are implemented in network devices, the network authority service 140 can serve multiple different client devices (e.g., multiple different host operating systems). For instance, the policy monitoring and enforcement may be implemented in routers, switches, firewalls, and/or other network equipment.

In some implementations, the ticket information can be used to inform routing decisions. For example, the information can be used by the local authority service 120 and/or the network authority service 140 to determine a network path to be taken by packets and/or to determine a network interface to be used on a device with multiple network interfaces. In some instances, the information can be used to detect service load and provision capacity at CDN midpoints.

Accordingly, by the application's presentation of a handle to a ticket or a reference ID for a ticket, as illustrated by 154 in FIG. 1, the host operating system 102 or other network components (routers, switches, firewalls, etc.) can understand the application's intent and effectively enforce security requirements on the application. With understanding of the application's intent, the host operating system 102 ensures the application's network access is in compliance with policies 114, 148. Moreover, since the ticket provides a holistic, end-to-end view of information used to establish the connection, the ticket can be used to enforce security requirements in any one of various layers used to establish the network connection, this may include layers in a client device and/or layers in network devices. In various implementations, the ticket, or a handle to the ticket, can be inserted (e.g., embedded, encapsulated, encoded etc.) into a data packet to be communicated over an established network connection. In alternative implementations, a data packet can include the reference ID for the ticket. In some embodiments, the ticket contains a valid client requestor ID. In some embodiments, the data packet(s) include a security token and/or cryptographic key in reference to the ticket. Upon interception of the data packet as it is communicated throughout various connection layers, the ticket, or reference to the ticket can be used to access and evaluate (e.g., by a firewall) the information in the ticket against a policy to determine whether the data packet should be forwarded or dropped.

In some examples, a ticket can be chained to multiple (transit) authority services. The ticket can be forwarded and processed by each service to achieve access to a resource. The chain is created by including proofs of a ticket in a higher authority. These proofs may be cryptographic, or contain the appropriate ID. Moreover, the proofs can be associated with a determination that the ticket is exactly the same across the multiple authority services. In some scenarios, the IDs may be the same or different across the authority services.

In various examples, access to the resource is transparent for the application 108. Transparency can be important for older applications (e.g., legacy applications) that are not aware of ticketing, the local authority service 120, and/or the network authority service 140. For example, an application can call a socket API to connect to a resource (e.g., www.examplewebpage.com). Then, the local authority service 120 and/or the network authority service 140 tracks and collects the information and creates the ticket. If the resource associated with the ticket is in-policy, the local authority service 120 can allow the application to transparently connect to the resource (e.g., www.examplewebpage.com) and/or download data. If the resource associated with the ticket is not in-policy, the policy enforcement component(s) can prevent network traffic (e.g., drop the network traffic). In some implementations, the network protocol components may notify the application that the resource is prohibited and/or unavailable.

In various examples, the application's 108 access to resources can be restricted (e.g., sandboxed). For example, a policy 114, 148 can define a set of applications, each of which are limited to access specific resources from specific locations. An example policy can be defined as follows:

policy lookup is "allow" access, the traffic is forwarded. If the result of the policy lookup is "deny" access, then the traffic is dropped.

In various examples, the components of an authority service (e.g., the local authority service 120) are configured to transparently handle access to a resource via changing networks (e.g., switch from using a Wi-Fi network interface to access a resource to using a mobile broadband network interface to access a resource). That is, the local authority service 120 can manage multi-homing and connection establishment for an application. For instance, a device may be connected to multiple networks where an individual network provides access to a separate instance of the same resource (e.g., the different instances host the same content). The local authority service 120 can be configured to ensure that the device has access to at least one of the multiple networks to maintain access to the resource. In embodiments where there is simultaneous access via multiple networks, a policy may define a preferred network interface (e.g., to select) and/or a preferred network (e.g., based on security, speed, cost, and reliability).

In various examples, an authority service can parse the content included in a data packet to confirm that the data being exchanged is associated with the intent of the application (e.g., is associated with the ticket established based on the intent). In some instances, a local calculation may be executed based on multiple considerations including policy, security, speed, cost and reliability. Monitoring information from the local policy enforcement component 132 may provide input to this calculation.

In various examples, the intent is provided to the resource. This may be provided from one or more sources including an application 108, host operating system 102, network

| Application | Client Location | Resource | Action |
| --- | --- | --- | --- |
| * | * | * | Deny |
| Internet Explorer | GPS: North America | *.contoso.com | Allow |
| Windows-FTP | *.corp.contoso.com | *.corp.contoso.com | Allow |
| Word | *.corp.contoso.com | 1.2.0.0/16 | Allow |
| PowerPoint | 1.2.0.0/16 | engineering.sharepoint.contoso.com | Allow |

The wildcard (*) can match any name or IP address. In various examples, the default is a "deny" access action and exceptions can be built based on specific application, specific client locations, and/or specific resources. In an example scenario, if a user attempts to download a document using the Windows-FTP software application from a resource named www.fakesite.com, the access attempt is denied. However, if the user attempts to download a document using the Windows-FTP software application and the resource is from documents.corp.contoso.com, successful access to the resource is enabled/allowed.

In various examples, a mechanism (e.g., a unique application identifier and/or a ticket) can be used to map network traffic so that the network traffic is identifiable from a specific application at which it originates to the time it emerges from the operating system. To ensure that traffic is identifiable end-to-end, it may be tagged with a unique application identifier and/or the ticket information. In other embodiments, a traffic map from an interim component is provided as part of the policy data model (e.g. specific source TCP ports on a NAT). In some implementations, the policy enforcement components can take a packet (or "packet flow") and map the packet to the correct application identifier and/or ticket for a policy lookup. If the result of the authority service 140. The resource can then make a decision, based on the intent, on whether to provide information to the application. For instance, the resource can grant a ticket to the application, and may communicate the ticket information to intermediate routers, switches, firewalls and other network devices configured to route traffic based on the ticketing information. In some implementations, the ticket information can be used to inform routing decisions. For example, the resource can request that the application configure a temporary IPv6 address with the host address portion containing some of the ticketing information. In some implementations, the information can be used to detect service load and provision capacity at CDN mid-points or at the servers themselves.

In various examples, the resource and the application can exchange connectivity information and implement a model in which the resource connects back to the application. In this example, the ticket ensures that the local authority service 120 and/or the network authority service 140 are allowing incoming connections to the application 108. This can be useful in example scenarios such as supercomputing and machine learning which may experience a time delay from when the request was made to when the result is available. Moreover, this can also be useful in other scenarios to balance many application requests when the resource is experiencing a long processing queue.

Figure 2:
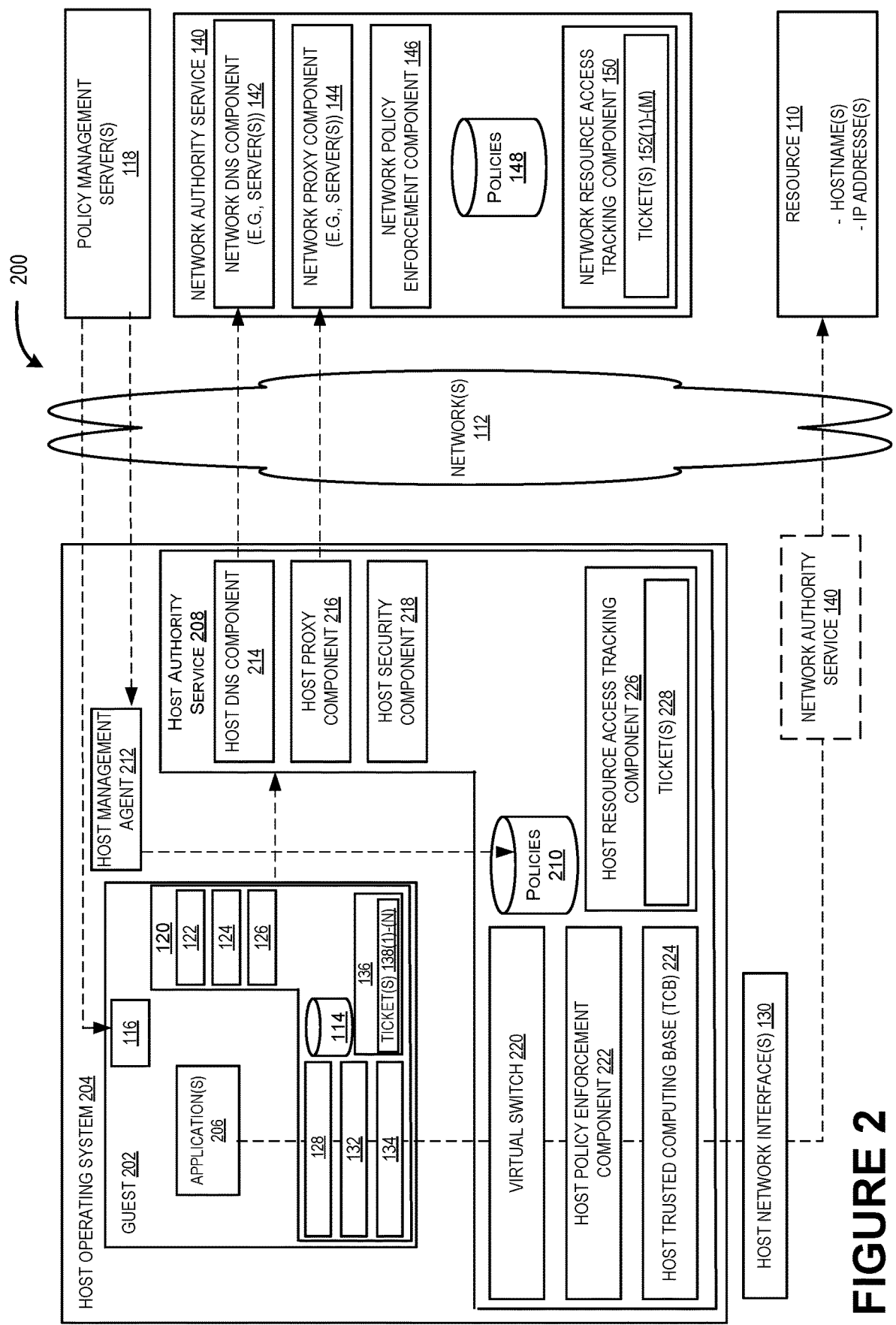
FIG. 2 illustrates another example environment in which the establishment and maintenance of a network connection, in accordance with policies, can be implemented.

FIG. 2 illustrates another example environment 200 in which the establishment and maintenance of a network connection, in accordance with policies, can be implemented. FIG. 2 is similar to FIG. 1, however, the applications are using a virtualization mechanism to execute in the form of a guest 202. The guest 202 can be a guest operating system or runtime such as a virtual machine, a container, an application container, or an emulated runtime environment. Thus, the host operating system 204 can be configured to host multiple guests 202 (e.g., in a nested architecture). The example environment 200 of FIG. 2 can be implemented in scenarios where the host operating system 204 and/or infrastructure is trusted and one or more applications 206 or other components within a virtualization mechanism are untrusted (e.g., a hosted datacenter in which one or more untrusted applications are running).

In various examples, the guest 202 includes the "local" components illustrated in FIG. 1, such as the policies 114, the local management agent 116, the local authority service 120, the local DNS component 122, the local proxy component 124, the local security component 126, the local network protocols component 128, the local policy enforcement component 132, the local TCB component 134, and the local resource access tracking component 136. In some implementations such as a virtual machine, fully independent "local" components may be present. In lighter weight implementations such as a container, these components may depend on host operating system 204 components. In one example, one or more "local" components may consist of data that is partitioned for the container and runtime is provided by host operating system 204. In another example, the components of host operating system 204 are instanced per container, providing the container the data it needs, however the runtime may be on the host operating system 204. Containers in other embodiments may apply additional techniques to meet security, isolation, density, and other requirements.

FIG. 2 further illustrates that the host operating system 204 includes an intermediate authority service, such as the host authority service 208, as well as policies 210 and a host management agent 212. The host authority service 208 can also include a host DNS component 214, a host proxy component 216, a host security component 218, a virtual switch 220, a host policy enforcement component 222, a host TCB component 224, and a host resource access tracking component 226 (e.g., including tickets 228). Since the host operating system 204 is a trusted and secure entity, the "host" components can be used, in association with the techniques described herein, to ensure that an untrusted application 206 executing via the guest 202 (e.g., a guest operating system) is behaving in accordance with policies 210, 148. In various examples, a guest operating system may be a full operating system instance such as a virtual machine, or any type of operating-system-level virtualization such as a container.

In a first example scenario, when an application 206 wants access to a resource, the guest 202 (e.g., the local DNS component 122 and/or the local proxy component 124) sends queries to the host authority service 208 with its intent. The application's intent may contain a URL to get access to a website, for example. The host authority service 208 then checks its policies 210 in a policy store and, if the policy check is a success, the query result can be resolved (e.g., for proxy and/or DNS) and/or propagated to one or more other authority services. If the query is successfully returned, the host authority service 208 can further check to determine if the resource is allowed. If the resource is allowed, the host authority service 208 returns a handle to, or a reference ID for, the ticket for connectivity to the application 206. When the application 206 requests to connect to the resource, the application 206 presents this handle to, or a reference ID for, the ticket to the host authority service 208 and the host policy enforcement component 222 does a policy check to determine whether to forward network traffic or drop network traffic. In some implementations, one or more of the authority services may require the entire ticket to be passed.

In a second example scenario, when an application 206 wants access to a resource, the guest 202 communicates the intent of the application to the local authority service 120. The local authority service 120 checks the policies 114 in a policy store and if the policy check succeeds, the local authority service 120 queries the host authority service 208 for the resource. When the host authority service 208 receives the query, it also checks its policies 210 in the policy store and, if this subsequent check succeeds, the host authority service 208 checks if the resource is allowed and optionally identifies the best instance of a resource if multiple instances are available. The host authority service 208 then generates a ticket and provides a handle to, or a reference ID for, the ticket to the local authority service 120. The local authority service 120 can then generate its own ticket and provide it to the application 206 for use when connecting to the resource. When the local authority service 120 receives a connect request and a ticket, it proxies the ticket information, and provides the host authority service 208 with the handle to, or a reference ID for, the ticket it provided to access that resource and connectivity succeeds. In some alternative implementations, the local authority service 120 can use a transparent mechanism, and does not grant separate tickets, instead reusing the tickets granted by the host authority service 208.

In various examples, to optimize for scalability and/or prevent too many policy checks, the intent of the applications 206 may be communicated to the host authority service 208: (i) on a per-flow basis at the beginning of the flow or TCP connection establishment, (ii) on a bulk registration basis, in which the applications 206 and guest 202 pre-register with the host authority service 208 for a set of hostnames and resources (in this scenario the host authority service 208 can perform pre-fetch resource and connectivity information, loading this into a cache for faster access), and/or (iii) on a per-policy basis, in which the guest 202 shares policy with the host authority service 208 to enable bulk registration or the host management agent 212 provides policy to the host authority service 208 to enable pre-fetching. In various examples, pre-registration may implement a model in which the application 206 is "listening" for connections and the pre-registered resource 110 connects back to the application 206.

In some implementations, the host operating system 204 can be a secure and trusted virtual machine.

Figure 3:
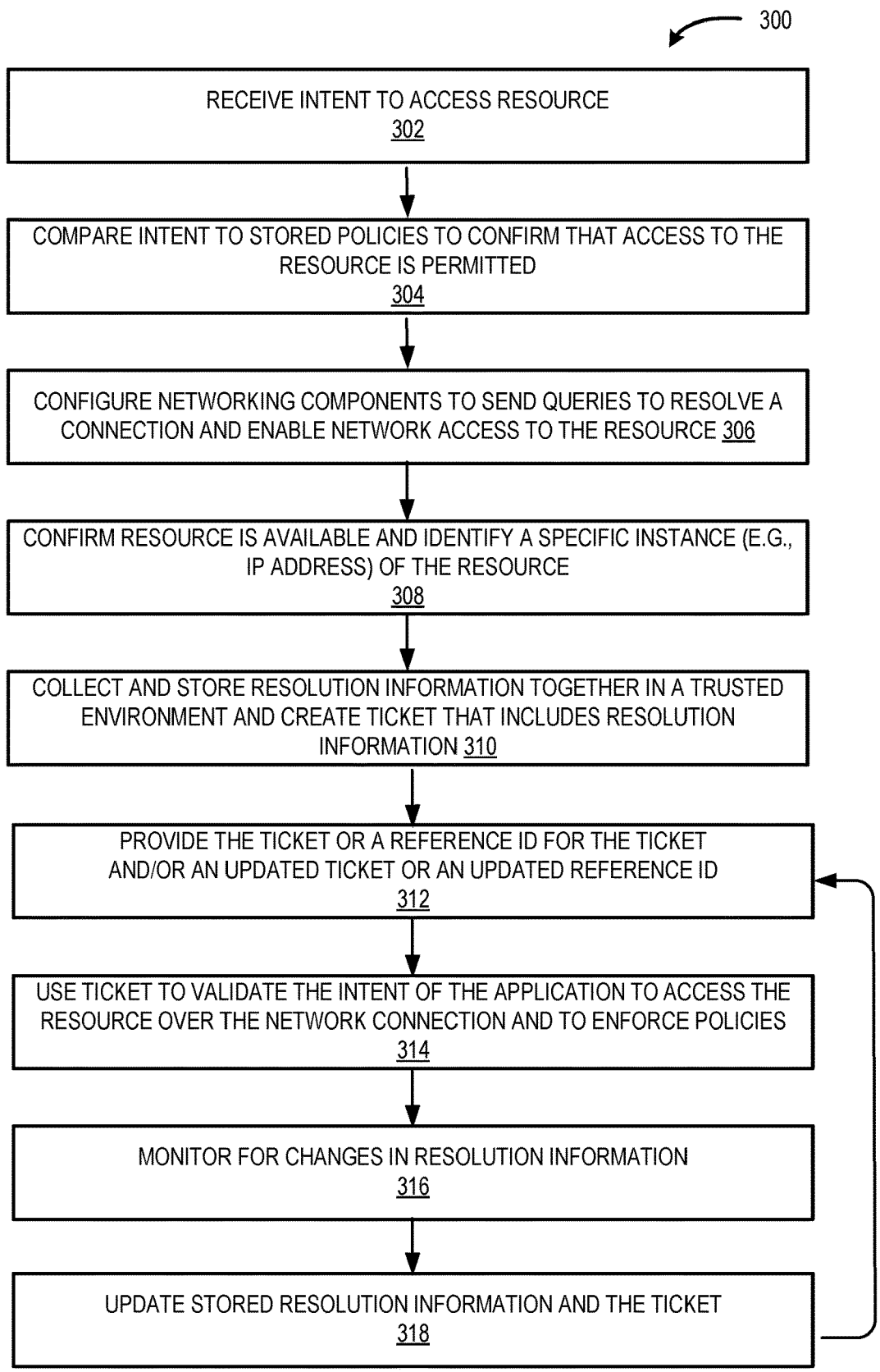
FIG. 3 illustrates an example process that creates and updates a ticket useable to access a resource.
Figure 4:
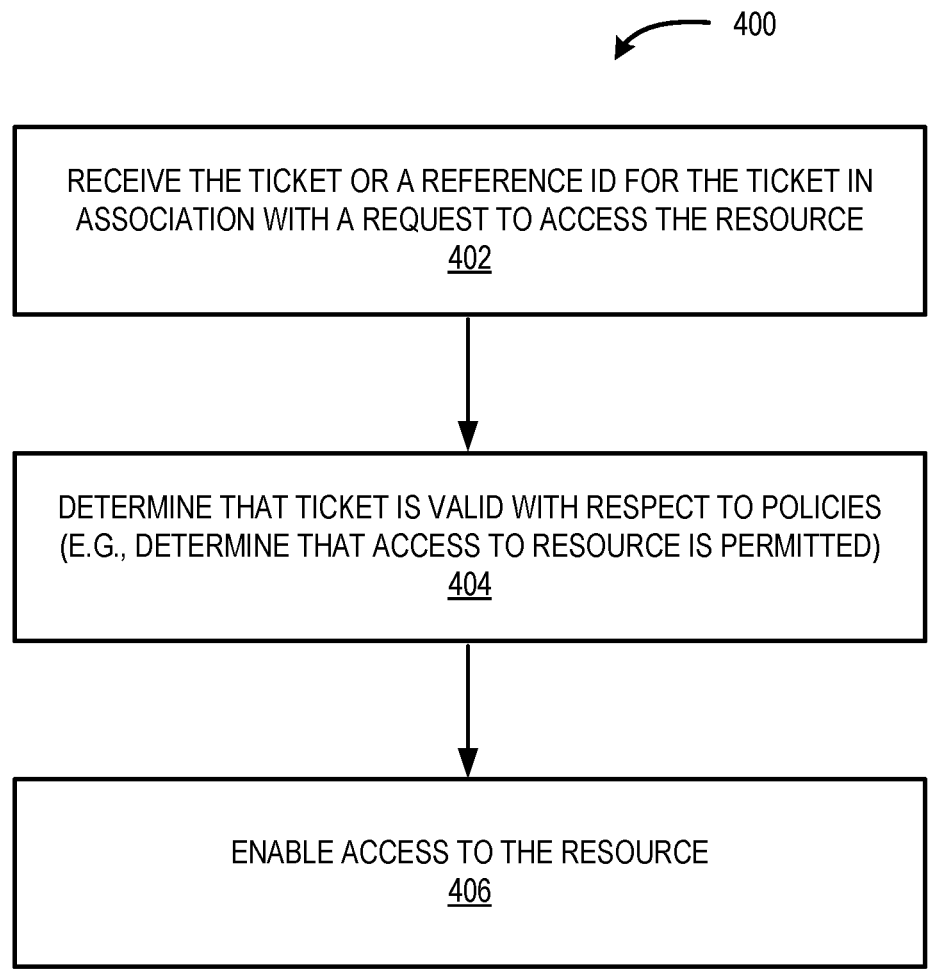
FIG. 4 illustrates an example process in which a ticket is used to access a resource.
Figure 5:
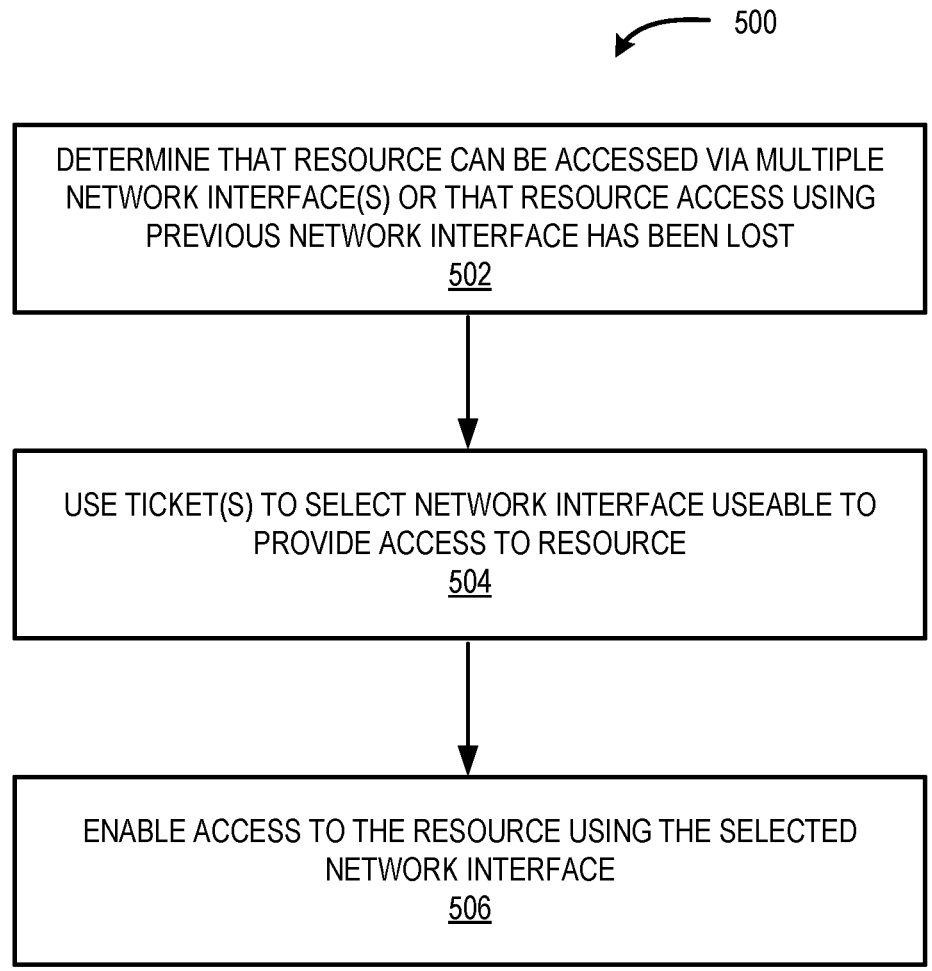
FIG. 5 illustrates another example process in which a ticket is used to access a resource.

FIGS. 3-5 individually illustrate an example process for employing the techniques described herein. The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

FIG. 3 illustrates an example process 300 that creates and updates a ticket useable to access a resource. In a first example implementation, the example process 300 can be implemented by one or more components of the local authority service 120, as illustrated in FIG. 1. In a second example implementation, the example process 300 can be implemented by one or more components of the network authority service 140, as illustrated in FIG. 1. In a third example implementation, the example process 300 can be implemented by a combination of one or more components of the local authority service 120 and one or more components of the network authority service 140, as illustrated in FIG. 1. In a fourth example implementation, the example process 300 can be implemented by the local authority service 120 and the host authority service 208, as illustrated in FIG. 2. In a fifth example implementation, the example process 300 can be implemented by (i) the local authority service 120 and (ii) the host authority service 208 and/or the network authority service 140, as illustrated in FIG. 2. The example process 300 can be implemented by other systems and other components as well.

At 302, an intent to access a resource over a network is received. The intent can be received when the host operating system 102 or the guest 202 boots and/or obtains network connectivity. The intent to access the resource can be requested by the application, or alternatively, by an entity within which the application is executing such as a virtual machine, a physical machine, a container, a host computer, a run time environment, a network component, an emulator, and so forth.

At 304, the intent is compared to policies to confirm that access to the resource is permitted (e.g., the resource is in-policy). For example, an authority service can check the intent against policies.

At 306, networking components are configured to send queries to resolve a connection and enable network access to the resource.

At 308, the resource is confirmed to be available, and in some implementations, a specific instance of the resource is identified (e.g., an IP address of multiple IP addresses is identified).

At 310, information for an available resource is collected and stored in a trusted and secure environment and a ticket that includes the information is created. For instance, the information can include data such as proxy data (e.g., for detection and/or determination, proxy URL, proxy name, proxy address, proxy port, resource URL, interfaces used by DNS or a proxy resolution instance), interface binding or scoping data specified by a connectivity policy, an interface that was acquired/connected, hostname data (e.g., Domain Name System (DNS) records, multicast DNS (mDNS), APPLE BONJOUR®, Directory Service records, NetBIOS Name Service (NBNS) member list, etc.), and/or a proof of trust (e.g., a proof of trust from a higher authority). As described above, the ticket provides a holistic view into the information required to establish and/or maintain a connection.

At 312, a handle to the ticket, or in an alternative implementation, a reference identifier for the ticket, is provided (e.g., to an application). In some instances, the ticket can be provided to the application.

At 314, the ticket is used to validate the intent of the application to access the resource over the network connection and to enforce policies on the connectivity of the application. For example, upon receiving, from the application, the handle to the ticket or the reference identifier for the ticket, an authority service can evaluate the ticket (e.g., the information of the ticket) which is stored in a trusted and secure environment (e.g., by the local resource access tracking component 136 or the network resource access tracking component 150).

At 316, in various examples, changes in the information are monitored. For example, components of an authority service can monitor a resource associated with a ticket that has provided access to the resource to determine if any changes have occurred (e.g., the resource becomes unavailable or prohibited, an updated server infrastructure changes IP addressing information, etc.). In response, a resource access tracking component can be notified of the changes and the ticket can be seamlessly updated, at 318.

Then, the process can return to 312 where the application is notified of an updated ticket (e.g., via an updated handle or an updated reference ID for the ticket). Operations 312, 314, 316, and 318 can be continually implemented throughout the life of the network connection.

In various examples, the process 300 can be implemented for individual network interfaces of a device (e.g., configured to access different networks).

FIG. 4 illustrates an example process 400 in which a ticket is used to access a resource. In a first example implementation, the example process 400 can be implemented by one or more components of the local authority service 120, as illustrated in FIG. 1. In a second example implementation, the example process 400 can be implemented by one or more components of the network authority service 140, as illustrated in FIG. 1. In a third example implementation, the example process 400 can be implemented by a combination of one or more components of the local authority service 120 and one or more components of the network authority service 140, as illustrated in FIG. 1. In a fourth example implementation, the example process 400 can be implemented by the local authority service 120 and the host authority service 208, as illustrated in FIG. 2. In a fifth example implementation, the example process 400 can be implemented by (i) the local authority service 120 and (ii) the host authority service 208 and/or the network authority service 140, as illustrated in FIG. 2. The example process 400 can be implemented by other systems and other components as well. The example process 400 can be implemented in association with example process 300 (e.g., operation 314).

At 402, a handle to the ticket, or in an alternative implementation, a reference identifier for the ticket, is received (e.g., from an application) in association with a request to access the resource.

At 404, it is determined that the ticket is valid with respect to policies (e.g., it is determined that access to the resource is permitted).

At 406, access to the resource is enabled based on the valid ticket associated with the application.

FIG. 5 illustrates another example process 500 in which a ticket is used to access a resource. In a first example implementation, the example process 500 can be implemented by one or more components of the local authority service 120, as illustrated in FIG. 1. In a second example implementation, the example process 500 can be implemented by one or more components of the network authority service 140, as illustrated in FIG. 1. In a third example implementation, the example process 500 can be implemented by a combination of one or more components of the local authority service 120 and one or more components of the network authority service 140, as illustrated in FIG. 1. In a fourth example implementation, the example process 500 can be implemented by the local authority service 120 and the host authority service 208, as illustrated in FIG. 2. In a fifth example implementation, the example process 500 can be implemented by (i) the local authority service 120 and (ii) the host authority service 208 and/or the network authority service 140, as illustrated in FIG. 2. The example process 400 can be implemented by other systems and other components as well.

At 502, it is determined that the resource can be accessed via multiple different network interfaces or that a resource access using a previous network interface has been lost.

At 504, a new network interface (e.g., and a new network) is selected, using a ticket, to provide continued access to the resource. The selection can be made in accordance with a policy that includes various factors such as security, speed, cost, and/or reliability. In some examples, a ticket has already been created for the new network interface based on a previously communicated intent. In further examples, a new ticket can be created or re-created based on a subsequent request from an application.

At 506, access to the resource is enabled using the selected network interface.

Figure 6:
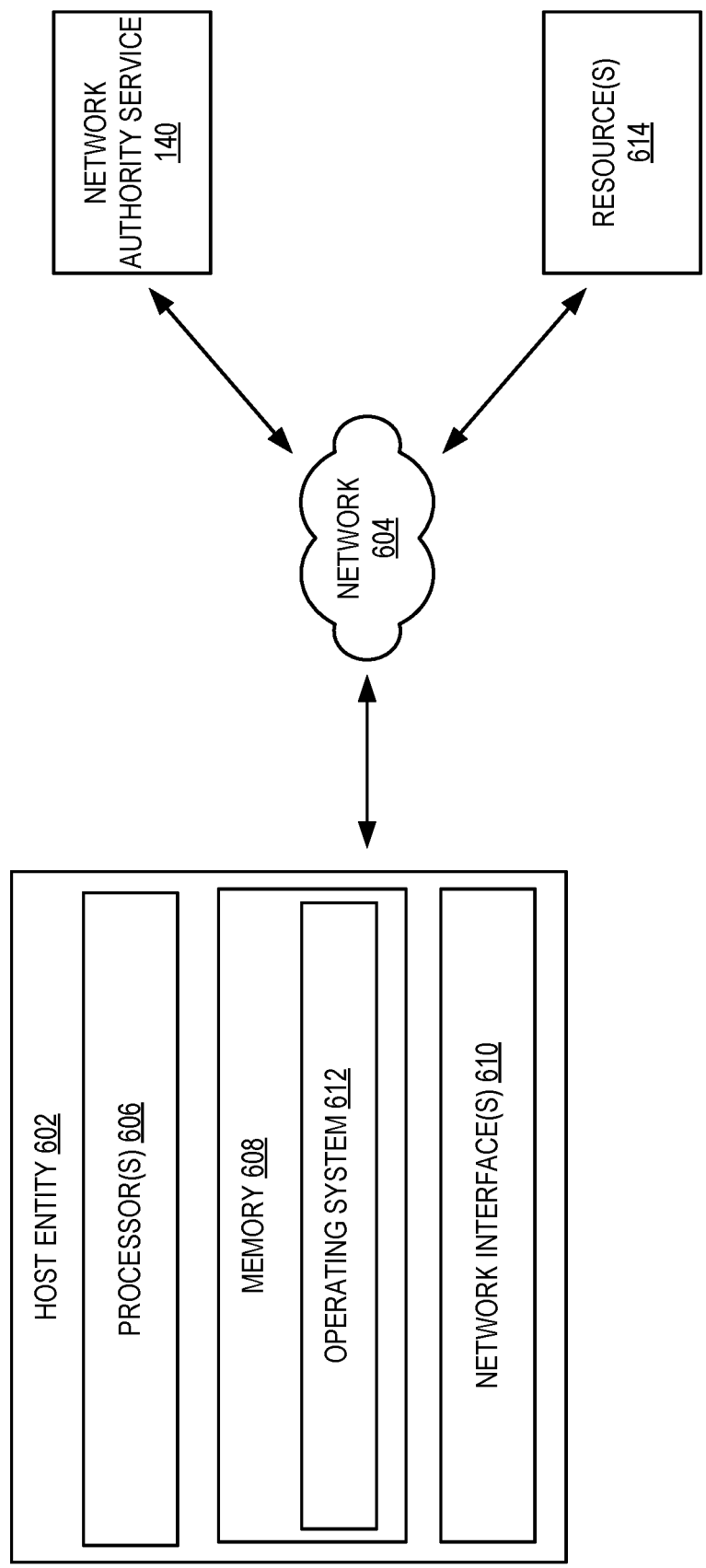
FIG. 6 illustrates an example computing environment capable of executing the techniques and systems described herein.

FIG. 6 illustrates an example computing environment capable of executing the techniques and systems described above with respect to FIGS. 1-5. In various examples, the computing environment includes a host entity 602 operating on, in communication with, or as part of a network 604. The host entity 602 can include a smart phone, a mobile phone, a personal digital assistant (PDA), an electronic book device, a laptop computer, a desktop computer, a tablet computer, a portable computer, a gaming console, a personal media player device, a server computer, or any other electronic device. The host entity 602 can include processor(s) 606, memory 608, and network interface(s) 610.

The processor(s) 606 can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 608.

The memory 608 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random access memory (RAM), Resistive RAM (ReRAM), 3D XPoint non-volatile memory, read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

In various examples, memory 608 includes an operating system 612 (e.g., host operating system 102, host operating system 204, and/or guest 202). The operating system 612 is configured to provide network access, via network(s) 604, to the network authority service 140 and the resources 614.

Network(s) 604 can comprise a wide area network (WAN), a local area network (LAN), a personal area network (PAN), a network specific to a datacenter (e.g., an Intranet, a storage area network (SAN)), a mobile telephone network (MTN), etc. A network can also comprise switches that connect various devices to routers and/or other devices that can act as bridges between data networks. In some implementations, the computing environment can operate within a network service (e.g., a cloud service, a data center, etc.).

Figure 7:
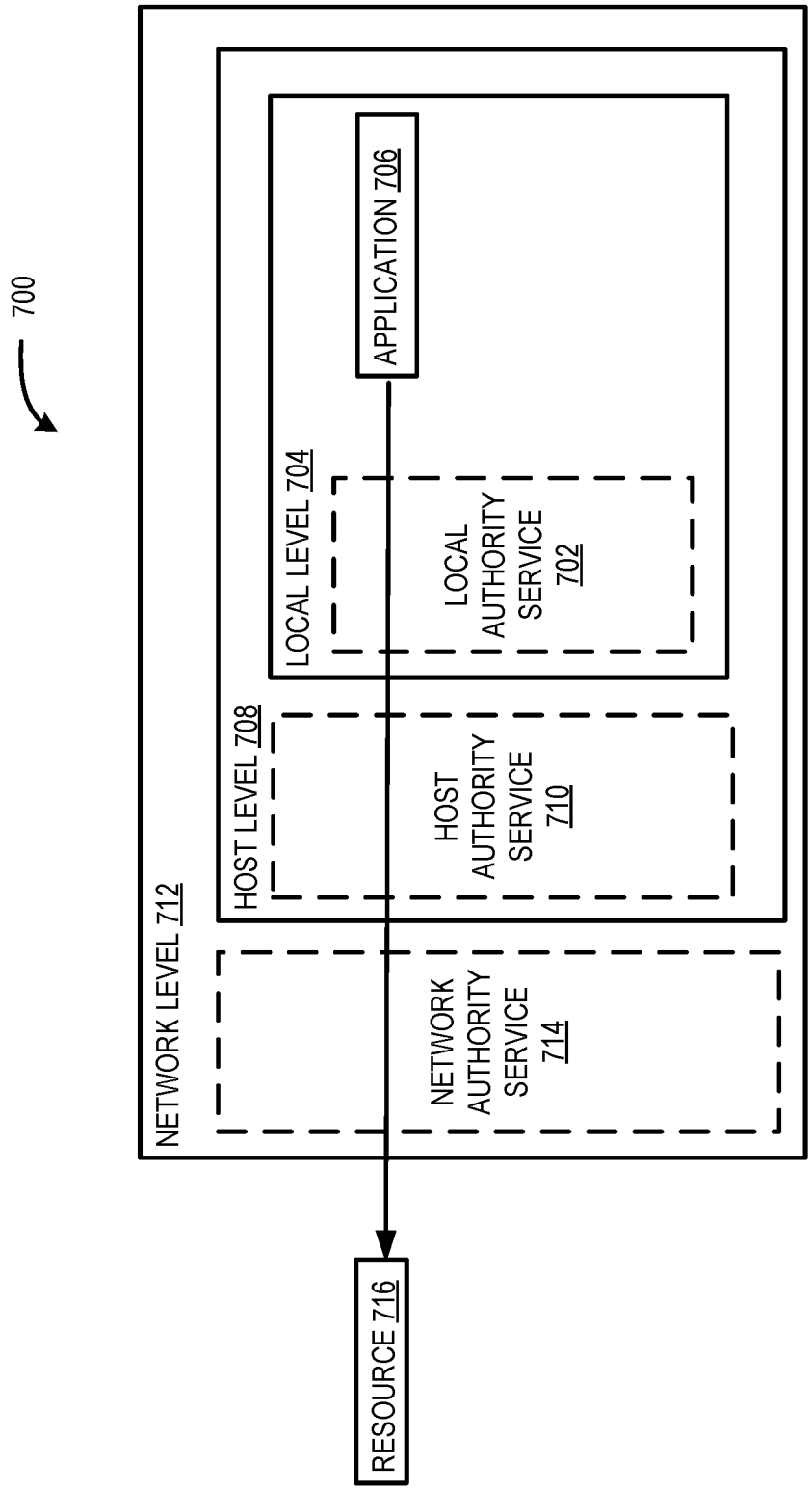
FIG. 7 illustrates an example architecture with multiple levels (e.g., nested levels), within which multiple tickets can be linked, or chained, together.

FIG. 7 illustrates an example architecture 700 with multiple levels (e.g., nested levels), within which multiple tickets can be linked, or chained, together. For instance, a first authority service (e.g., the local authority service 702) can be configured within a first level (e.g., the local level 704). In various examples, the local level 704 is associated with a guest operating system or runtime such as a virtual machine, a container, a container, or an emulated runtime environment. Accordingly, an application 706 can execute within the first level (e.g., execute using a network connection).

As illustrated, the first level is nested within a second level (e.g., a host level 708) that includes a second authority service (e.g., a host authority service 710). In various examples, the host level 708 is associated with a host operating system (e.g., a physical machine or a host computer). Moreover, the second level is nested within a third level (e.g., a network level 712) that includes a third authority service (e.g., a network authority service 714). In various examples, the network level 712 is associated with a network device such as a router, a switch, a firewall device, and/or other network equipment. The various authority services illustrated in FIG. 7 can individually include components described above with respect to FIG. 1 and/or FIG. 2.

In the example architecture of FIG. 7, the authority service of each level can be an enforcement service for a nested level. For example, the local authority service 702 can create and use a first ticket to validate the intent of the application 706 (e.g., when accessing resource 716). The host authority service 710 can create and use a second ticket, which can be linked or chained to the first ticket, to validate the intent of the nested, local level 704. Stated another way, the host level 708 and the host authority service 710 can treat the local level 704 and local authority service 702 as an "application" (e.g., an untrusted component) executing on a host computer. Furthermore, the network authority service 714 can create and use a third ticket, which can be linked or chained to the first and second tickets, to validate the intent of the nested, host level 708.

Consequently, in this scenario, an outer level can use a ticket to securely validate the intent of an inner or nested level (e.g., enforce policies at each level), and tickets can be chained together to establish and/or maintain an individual network connection.

Example Clauses

Example Clause A, a system comprising: one or more processors; memory; an authority service stored in the memory and executable by the one or more processors to: receive a request for an application to access a resource over a network; send, based at least in part on the request, queries to network components to resolve a network connection to access the resource; collect, based at least in part on the queries, information that enables the application to access the resource over the network connection; create a ticket that includes the information; use the ticket to validate an intent of the application to access the resource over the network connection; and in response to validating the intent, enforce a network access on the application.

Example Clause B, the system of Example Clause A, wherein the authority service is further executable by the one or more processors to determine that a networking policy permits, based at least in part on the information included in the ticket, access to the resource over the network connection, wherein the ticket comprises a trusted mechanism useable to enforce the networking policy based at least in part on the information being previously collected by the authority service, thereby preventing the application from falsifying resource access.

Example Clause C, the system of Example Clause A or Example Clause B, wherein the authority service is further executable by the one or more processors to map a hostname provided in the request to an Internet Protocol (IP) address for the resource which is included in the information.

Example Clause D, the system of any one of Example Clauses A through C, wherein the authority service is further executable by the one or more processors to: provide a handle to the ticket to the application; and receive the handle to the ticket in association with a subsequent request from the application, the subsequent request including the intent of the application to access the resource over the network connection, wherein using the ticket to validate the intent of the application comprises comparing the handle to the ticket received from the application with the ticket stored in a trusted environment to ensure the information complies with one or more policies.

Example Clause E, the system of any one of Example Clauses A through C, wherein the authority service is further executable by the one or more processors to: provide a reference identifier for the ticket to the application; and receive the reference identifier for the ticket in association with a subsequent request from the application, the subsequent request including the intent of the application to access the resource over the network connection, wherein using the ticket to validate the intent of the application comprises using the reference identifier to verify that the information is to be used to access the resource over the network connection.

Example Clause F, the system of any one of Example Clauses A through E, wherein the information includes: proxy data comprising at least one of a proxy script uniform resource locator (URL), a web proxy auto detection (WPAD), a proxy name, a proxy address, a proxy port, and/or an interface used by a proxy resolution instance.

Example Clause G, the system of any one of Example Clauses A through F, wherein the information includes: hostname data comprising at least one of Domain Name System (DNS) records, multicast DNS (mDNS), Link Local Multicast Name Resolution (LLMNR), Directory Service records, and/or a NetBIOS Name Service (NBNS) member list.

Example Clause H, the system of any one of Example Clauses A through G, wherein the authority service is further executable by the one or more processors to: compare the request to policies stored in a policy store to confirm that access to the resource over the network is permitted; and confirm that the resource is available to be accessed.

Example Clause I, the system of any one of Example Clauses A through H, wherein the authority service is further executable by the one or more processors to: monitor for changes to the information, the changes including at least one of a changing local IP address, resource information proxy configuration, and/or a switch in a network interface being used to access the resource; and update the ticket based at least in part on the monitored changes.

Example Clause J, the system of any one of Example Clauses A through I, wherein the authority service is further executable by the one or more processors to evaluate, based at least in part on a handle to the ticket or a reference identifier for the ticket inserted in a data packet to be communicated over the network connection and throughout various connection layers, the information to determine that a networking policy does not prohibit access to the resource.

Example Clause K, the system of any one of Example Clauses A through J, wherein: the request is received directly from the application; or the request is received from an entity within which the application is executing.

Example Clause L, the system of any one of Example Clauses A through K, wherein the authority service and the application are both executed locally on the system.

Example Clause M, the system of any one of Example Clauses A through K, wherein the authority service is configured within a virtual machine, a container, or a runtime environment of the system, the system further comprising another authority service configured within a host operating system, the other authority service executable to: receive another request for the authority service to access the resource over the network; send, based at least in part on the other request, additional queries to network components to resolve the network connection to access the resource; collect, based at least in part on the additional queries, additional information that enables the authority service to access the resource over the network connection; create another ticket that includes the additional information; associate the other ticket with the ticket use the other ticket to validate an intent of the authority service to access the resource over the network connection; and in response to validating the intent, enforce a network access on the authority service.

Example Clause N, the system of any one of Example Clauses A through M, wherein the resource is declared by a developer of the application as part of a deployment process, the deployment process including one or more updated policies.

While Example Clauses A through N are described above with respect to a system, it is also understood in the context of the document that the subject matter of Example Clauses A through N can be implemented with respect to a method, computer-readable storage media, and/or a device.

Example Clause O, a method comprising: receiving, by an authority service implemented via an operating system of a device, a request for an application to access a resource over a network; sending, by the authority service and based at least in part on the request, queries to network components to resolve a network connection to access the resource; collecting, by the authority service and based at least in part on the queries, information that enables the application to access the resource over the network connection; creating, by the authority service, a ticket that includes the information; using the ticket to validate an intent of the application to access the resource over the network connection; and in response to validating the intent, enforcing a network access on the application.

Example Clause P, the method of Example Clause O, further comprising determining that a networking policy permits, based at least in part on the information included in the ticket, access to the resource over the network connection, wherein the ticket comprises a trusted mechanism useable to enforce the networking policy based at least in part on the information being previously collected by the authority service, thereby preventing the application from falsifying resource access.

Example Clause Q, the method of Example Clause O or Example Clause P, wherein the information includes: proxy data comprising at least one of a proxy script uniform resource locator (URL), a web proxy auto detection (WPAD), a proxy name, a proxy address, a proxy port, and/or an interface used by a proxy resolution instance; and hostname data comprising at least one of Domain Name System (DNS) records, multicast DNS (mDNS), Link Local Multicast Name Resolution (LLMNR), Directory Service records, and/or a NetBIOS Name Service (NBNS) member list.

Example Clause R, the method of any one of Example Clauses O through Q, further comprising: monitoring for changes to the information, the changes including at least one of a dynamically changing IP address or a switch in a network interface being used to access the resource; and updating the ticket based at least in part on the monitored changes.

Example Clause S, the method of any one of Example Clauses O through R, further comprising: intercepting a data packet be communicated over the network connection, the data packet including a reference identifier for the ticket: and using the reference identifier to access the ticket and determine, based at least in part on the information, that a networking policy does not prohibit access to the resource.

While Example Clauses O through S are described above with respect to a method, it is also understood in the context of the document that the subject matter of Example Clauses O through S can be implemented with respect to a system, computer-readable storage media, and/or a device.

Example Clause T, a system comprising: one or more processors; memory; an authority service stored in the memory and executable by the one or more processors to: receive a request for an application to access a resource over a network connection, the request comprising a handle to a ticket or a reference identifier for the ticket, the ticket including information that enables the application to access the resource over the network connection; evaluate the information included in the ticket to determine whether access to the resource by the application over the network connection is permitted in accordance with one or more networking policies; enable access to the resource based at least in part on a determination that access to the resource by the application over the network connection is permitted in accordance with the one or more networking policies; and prevent access to the resource based at least in part on a determination that access to the resource by the application over the network connection is not permitted in accordance with the one or more networking policies.

While Example Clause T is described above with respect to a system, it is also understood in the context of the document that the subject matter of Example Clause T can be implemented with respect to a method, computer-readable storage media, and/or a device.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:

1. A system comprising:
   one or more processors;
   memory;
   an authority service stored in the memory and executable by the one or more processors to:
      receive a request for an application to access a resource over a network;
      send, based at least in part on the request, a first query to collect proxy information useable to establish a network connection with the resource;
      send, based at least in part on the request, a second query to collect hostname information useable to establish the network connection with the resource;
      receive, based at least in part on the first and the second queries, the proxy information and the hostname information useable to establish the network connection with the resource;
      create a ticket that includes the proxy information and the hostname information;
      securely store the ticket in an operating system component thereby preventing the application from altering the proxy information or the hostname information included in the ticket; and
      use the proxy information and the hostname information included in the ticket to determine that the application is allowed to access the resource over the network connection.

2. The system of claim 1, wherein the authority service is further executable by the one or more processors to evaluate the proxy information and the hostname information included in the ticket to determine that access to the resource over the network connection complies with a networking policy, wherein the ticket comprises a trusted mechanism useable to enforce the networking policy based at least in part on the proxy information and the hostname information being previously received by the authority service, thereby preventing the application from falsifying resource access.

3. The system of claim 1, wherein the authority service is further executable by the one or more processors to map a hostname provided in the request to an Internet Protocol (IP) address for the resource which is included in the hostname information.

4. The system of claim 1, wherein the authority service is further executable by the one or more processors to:
   provide a handle to the ticket to the application; and
   receive the handle to the ticket in association with a subsequent request from the application, the subsequent request including an intent of the application to access the resource over the network connection, wherein using the proxy information and the hostname information included in the ticket to determine that the application is allowed to access the resource comprises comparing the handle to the ticket received from the application with the ticket stored in the operating system component to ensure the proxy information and the hostname information complies with one or more policies.

5. The system of claim 1, wherein the authority service is further executable by the one or more processors to:
provide a reference identifier for the ticket to the application; and
receive the reference identifier for the ticket in association with a subsequent request from the application, the subsequent request including an intent of the application to access the resource over the network connection, wherein using the proxy information and the hostname information included in the ticket to determine that the application is allowed to access the resource comprises using the reference identifier to verify that the proxy information and the hostname information is to be used to access the resource over the network connection.

6. The system of claim 1, wherein the proxy information includes at least one of a proxy script uniform resource locator (URL), a web proxy auto detection (WPAD), a proxy name, a proxy address, a proxy port, and/or an interface used by a proxy resolution instance.

7. The system of claim 1, wherein the hostname information includes at least one of Domain Name System (DNS) records, multicast DNS (mDNS), Link Local Multicast Name Resolution (LLMNR), Directory Service records, and/or a NetBIOS Name Service (NBNS) member list.

8. The system of claim 1, wherein the authority service is further executable by the one or more processors to:
monitor for changes to the proxy information and the hostname information, the changes including at least one of a changing local IP address, resource information proxy configuration, and/or a switch in a network interface being used to access the resource; and
update the ticket based at least in part on the monitored changes.

9. The system of claim 1, wherein the authority service is further executable by the one or more processors to evaluate, based at least in part on a handle to the ticket or a reference identifier for the ticket inserted in a data packet to be communicated over the network connection and throughout various connection layers, the proxy information and the hostname information to determine that a networking policy does not prohibit access to the resource.

10. The system of claim 1, wherein:
the request is received directly from the application; or
the request is received from an entity within which the application is executing.

11. The system of claim 1, wherein the authority service and the application are both executed locally on the system.

12. The system of claim 1, wherein the authority service is configured within a virtual machine, a container, or a runtime environment of the system, the system further comprising another authority service configured within a host operating system, the other authority service executable to:
receive another request for the authority service to access the resource over the network;
send, based at least in part on the other request, queries to network components to resolve the network connection to access the resource;
receive, based at least in part on the queries, additional information that enables the authority service to access the resource over the network connection;
create another ticket that includes the additional information;
associate the other ticket with the ticket;
use the other ticket to validate an intent of the authority service to access the resource over the network connection; and
in response to validating the intent, enforce a network access on the authority service.

13. The system of claim 1, wherein the resource is declared by a developer of the application as part of a deployment process, the deployment process including one or more updated policies.

14. The system of claim 1, wherein the first query is sent by a proxy component of the authority service and the second query is sent by a hostname component of the authority service.

15. A method comprising:
receiving, by an authority service implemented via an operating system of a device, a request for an application to access a resource over a network;
sending, by a first component of the authority service and based at least in part on the request, a first query to collect proxy information useable to establish a network connection with the resource;
sending, by a second component of the authority service and based at least in part on the request, a second query to collect hostname information useable to establish the network connection with the resource;
receiving, by the authority service and based at least in part on the first and second queries, the proxy information and the hostname information useable to establish the network connection with the resource;
creating, by the authority service, a ticket that includes the proxy information and the hostname information;
securely storing the ticket in an operating system component thereby preventing the application from altering the proxy information or the hostname information included in the ticket; and
using the proxy information and the hostname information included in the ticket to determine that the application is allowed to access the resource over the network connection.

16. The method of claim 15, further comprising determining that a networking policy permits, based at least in part on the proxy information and the hostname information included in the ticket, access to the resource over the network connection, wherein the ticket comprises a trusted mechanism useable to enforce the networking policy based at least in part on the proxy information and the hostname information being previously received by the authority service, thereby preventing the application from falsifying resource access.

17. The method of claim 15, wherein:
the proxy information comprises at least one of a proxy script uniform resource locator (URL), a web proxy auto detection (WPAD), a proxy name, a proxy address, a proxy port, and/or an interface used by a proxy resolution instance; and
the hostname information comprises at least one of Domain Name System (DNS) records, multicast DNS (mDNS), Link Local Multicast Name Resolution (LLMNR), Directory Service records, and/or a NetBIOS Name Service (NBNS) member list.

18. The method of claim 15, further comprising:
monitoring for changes to the proxy information and the hostname information, the changes including at least one of a dynamically changing IP address or a switch in a network interface being used to access the resource; and
updating the ticket based at least in part on the monitored changes.

19. The method of claim 15, further comprising:
intercepting a data packet be communicated over the network connection, the data packet including a reference identifier for the ticket; and
using the reference identifier to access the ticket and determine, based at least in part on the proxy information and the hostname information, that a networking policy does not prohibit access to the resource.

20. A system comprising:
one or more processors;
memory;
an authority service stored in the memory and executable by the one or more processors to:
    receive a request for an application to access a resource over a network;
    send, by a first component of the authority service and based at least in part on the request, a first query to collect proxy information useable to establish a network connection with the resource;
    send, by a second component of the authority service and based at least in part on the request, a second query to collect hostname information useable to establish the network connection with the resource;
    receive, based at least in part on the first and second queries, the proxy information and the hostname information useable to establish the network connection with the resource;
    create a ticket that includes the proxy information and the hostname information thereby providing the authority service a holistic view into how the network connection is established;
    provide the ticket to the application;
    securely store the ticket in an operating system component to prevent the application from altering the proxy information and the hostname information included in the ticket;
    receive a subsequent request for the application to access the resource over the network connection, the subsequent request comprising a handle to the ticket or a reference identifier for the ticket;
    evaluate the proxy information and the hostname information included in the ticket to determine whether access to the resource by the application over the network connection is permitted in accordance with one or more networking policies; and
    enable access to the resource based at least in part on a determination that access to the resource by the application over the network connection is permitted in accordance with the one or more networking policies.

* * * * *